Nov. 30, 1965  W. SCHROEDER  3,220,313
MACHINE TOOL POWER DRAWBOLT MECHANISM
Filed April 2, 1964
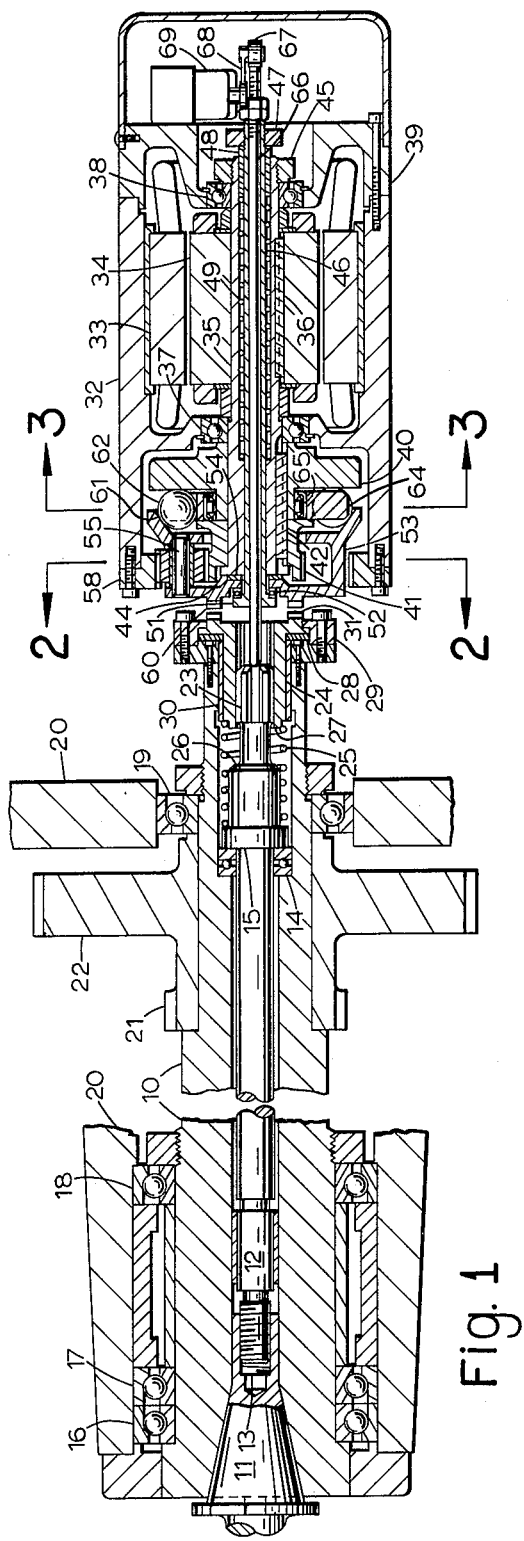
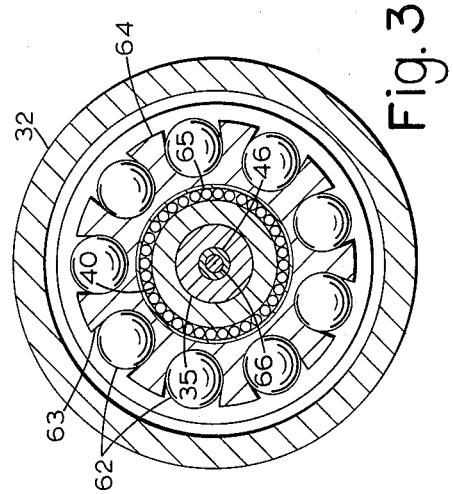
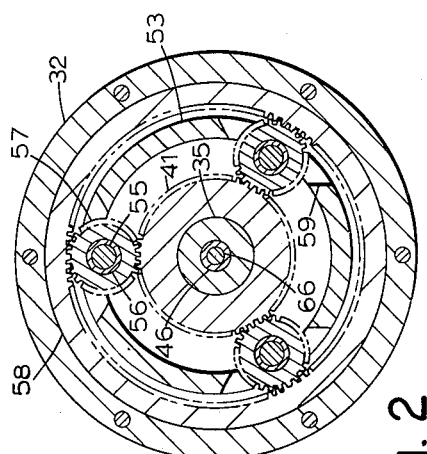
INVENTOR.
WALTER SCHROEDER
BY Howard O. Keiser
& Jack J. Earl
ATTORNEYS

United States Patent Office 3,220,313
Patented Nov. 30, 1965

3,220,313
MACHINE TOOL POWER DRAWBOLT
MECHANISM
Walter Schroeder, Cincinnati, Ohio, assignor to The Cincinnati Milling Machine Co., Cincinnati, Ohio, a corporation of Ohio
Filed Apr. 2, 1964, Ser. No. 356,790
6 Claims. (Cl. 90—11)

The present invention relates to machine tool spindle mechanisms and more particularly to a speed responsive clutch mechanism for power drawbolts especially suited for use in milling and boring machine spindles.

This invention is an improvement of the mechanism shown in U.S. Patent 2,667,819 issued February 2, 1954 to C. B. De Vlieg and titled "Power Lock for Tools and the Like." The invention of the cited patent has been applied in many machines and has performed satisfactorily in most cases. Failures of the mechanism have, however, occurred in some instances due to a failure of lubrication in the clutch mechanism by which the power drawbolt is driven. Failures of lubrication occur through the use of improper lubricants or as a result of an interruption of the supply of lubricant. Due to the high friction forces possible when adequate lubrication is not provided, the problem of lubrication is a critical factor in the satisfactory operation of the cited drawbolt mechanism.

It is therefore an object of this invention to provide an improved speed responsive clutch mechanism for connection of a drawbolt to a source of power in which clutch mechanism friction under dynamic loading is greatly reduced and the problem of lubrication is not a critical factor in its proper operation.

It is also an object of the invention to provide a clutch mechanism in which large forces can be employed without the problem of failure of lubrication causing excessive heating and galling of relatively movable parts therein.

It is a further object of this invention to provide a drawbolt mechanism which has improved effectiveness by reason of higher force transmission with reduced frictional forces in the mechanism.

It is a still further object of this invention to provide a compact power drawbolt drive mechanism which is concentrically arranged around a single drive shaft to reduce both its cost and the space required by it in the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes a drive shaft on which a flywheel member is fixed. A clutch member is rotatably received around the drive shaft adjacent to the flywheel member and has a frustro-conical cam surface around the shaft facing inward toward the drive shaft and toward the flywheel member. A set of balls of considerable mass are received between the clutch and flywheel members and are maintained in spaced relation around the drive shaft by a cage member. In this mechanism, the cage member is freely rotatable relative to the drive shaft, the clutch member, and the flywheel member. The cage has pockets therein elongated in the radial direction and one of the balls is received in each of the pockets for free rotation and for radial movement toward and from the drive shaft. The clutch member is biased toward the flywheel member such that the balls are held in contact between a plane side of the flywheel member and the cam surface of the clutch member and are forced inward in the slots toward the drive shaft. The clutch member is rotated at a rate less than the rate of rotation of the drive shaft such that the flywheel and clutch are rotated at different speeds. The balls roll between these two members and as a result of the different speeds of the clutch and flywheel members the balls are caused to orbit around the drive shaft with the cage member. The balls are thrown radially outward in the slots and when the orbital speed is sufficient to produce a force moving them outward that is greater than the force tending to move them inward, which latter force is produced by the bias on the clutch member, the clutch member is shifted against the bias force to engage and drive the drawbolt. In the preferred form, the drive shaft is the motor shaft and the means rotating the clutch member is an orbital gear, speed reduction drive concentrically arranged around the drive shaft with the clutch member.

A clear understanding of the construction and operation of the present invention can be obtained from the following detailed description in which reference is made to the attached drawings wherein:

FIG. 1 is a longitudinal section of a power drawbolt and spindle mechanism adapted for use in a milling machine.

FIG. 2 is a cross section of FIG. 1 on the plane of line 2—2 and viewed in the direction indicated.

FIG. 3 is also a cross section of FIG. 1 on the plane of line 3—3 and viewed in the direction indicated.

As shown, a spindle 10 has its forward end adapted to receive a standard tapered tool holder 11 that is securely held therein by a drawbolt 12. The drawbolt 12 is threaded at its forward end and is turned into a mating threaded socket 13 at the rear of the tool holder 11. The tool holder is drawn into the spindle 10 when the drawbolt is advanced into the socket 13 and a clamping force is produced between the holder 11 at the forward end of the spindle 10 and a thrust bearing 14 against which a shoulder 15 on the drawbolt 12 is pulled by the threaded engagement. During a cutting operation, the tool holder 11, spindle 10 and drawbolt 12 are all rotatable in unison, the spindle 10 being received in bearings 16–19 that are supported in a housing 20. Rotational drive is applied to the spindle 10 through either a high speed gear 21 or a low speed gear 22 by any conventional gear transmission, many forms of which are well known in the machine tool art. An example of such a spindle transmission is shown and described in U.S. Patent 2,555,242 issued May 29, 1951 upon an application filed by L. F. Nenninger, E. D. Vancil and F. A. Hassman. The transmission shown in the patent also includes a brake by which rotation of the spindle therein is prevented when power is not applied thereto, such a brake being useful in combination with a power drawbolt spindle to prevent rotation of the spindle by the drawbolt mechanism.

The rearmost end of the drawbolt 12 has a splined area 23 thereon which is axially movable through a mating bushing 24 by which the drawbolt is rotated to engage and disengage its threaded forward end in the socket 13.

The drawbolt 12 is normally biased forward by a spring 25 to engage the shoulder 15 against the thrust bearing 14 but the drawbolt 12 can move axially rearward until a stop shoulder 26 on the bushing 24 is engaged by a rear shoulder 27. For purposes of this disclosure, the forward direction is axially toward the end of the spindle 10 in which the holder 11 is received and the rearward direction is axially along the spindle 10 away from that end. Axial rearward movement of the drawbolt occurs when the holder 11 is inserted into the spindle 10 but before the drawbolt 12 is rotated to advance into the socket 13 or when the drawbolt is withdrawn from the socket 13 and the holder 11 sticks in the spindle 10. These situations are described in detail in the previously cited Patent 2,667,819. It is to account for this axial movement of the drawbolt 12 that the splined bushing 24 is used to drive the drawbolt. The bushing 24 is axially held in the spindle between a bearing member 28 and a retaining cap 29 and is rotatable in a journal member 30. The rear end face of the bushing 24 has clutch teeth 31 such as described in the Patent 2,667,819 by means of which the bushing 24 is rotated by the power driving unit to be described.

The power unit includes a housing 32 in which a reversible electric motor, comprised of stator windings 33 and rotor windings 34, is housed. The rotor windings are received over a motor shaft 35 that is in axial alignment with the drawbolt 12 and which is driven with the rotor 34 by means of a key 36. The shaft 35 is rotatable in bearings 37, 38 received in the housing 32 and a housing extension 39, respectively. A disc shaped flywheel member 40 is received over the shaft 35 adjacent to the bearing 37 and abutting against the flywheel 40 at the side opposite the bearing 37 is a pinion gear member 41. Both the flywheel 40 and pinion gear 41 are rotatable with the shaft 35 since a key 42 received in a keyway along the shaft 35 extends into and through both. A flange 44 is formed on the forward end of the shaft 35 and it is pulled against the pinion gear 41 by a nut 45 threaded over the rear end of the shaft 35 and tightened against the bearing 38 to hold the pinion 41 and flywheel 40 together.

The shaft 35 is tubular and a second smaller shaft 46 is received therethrough for limited axial movement. A nut 47 is threaded onto the rear end of the shaft 46 and a sleeve 48 is received over the shaft 46 adjacent to the nut 47. A spring 49 is received around the shaft 46 and is compressed between the sleeve 48 and the drive shaft 35. The spring 49 provides an axial rearward bias on the shaft 46 to force a flange 51 on its forward end against a thrust bearing 52 which is in turn received adjacent a clutch member 53 that is loosely received over and rotatable relative to the forward end of the shaft 46. An additional thrust washer 54 is received between the clutch member 53 and the forward end of the drive shaft 35. The spring 49 tends to hold the clutch member 53 back against the thrust washer 54 as shown when the clutch teeth 31, 60 are disengaged and the motor 33, 34 is deenergized. The clutch member 53 has a set of axle pins 55 received therein and spaced therearound over which journal bearing sleeves 56 are received. A small gear 57 is rotatably received over each of the sleeves 56 and is engaged with the pinion gear 41. A fixed internal ring gear 58 is attached at the forward end of the housing 32 and is concentric with the drive shaft 35. Each of the small gears 57 extends through an opening 59 through the side of the clutch member 53 and engages with the ring gear 58. Thus the pinion 41, the gear 57 and ring gear 58 provide an orbital gear mechanism by which the clutch member 53 is rotated at a speed reduced from the speed of the drive shaft 35 when the motor 33, 34 is energized.

The clutch member 53 has a set of clutch teeth 60 extending outward from the forward face thereof and these mate with and drive the teeth 31 of the bushing 24 when the clutch member 53 is shifted axially forward against the bias force of the spring 49. The clutch member 53 is shifted forward by a speed responsive clutch engaging mechanism that includes a frusto-conical cam face 61 extending around the rear of the clutch member 53 and facing inward toward the drive shaft 35 and flywheel member 40. A set of inertia balls 62 is received in the cam face 61 and these contact thereagainst. In the condition shown, with the teeth 31, 60 disengaged, the balls 62 are forced inward toward the shaft 35 to the bottom of radially extending pockets 63 that are formed in and spaced uniformly around a cage member 64. The balls 62 are also held back against the plane front face of the flywheel member 40. The cage member 64 is received over needle bearings 65 that are mounted on an extension of the flywheel member 40 around the shaft 35. Therefore the cage member 64 is freely rotatable relative to the shaft 35, flywheel 40 and clutch member 53.

The balls 62 act to engage the clutch member 53 when they are moved radially outward in the pockets 63 of the cage member 64 to force the clutch member 53 forward. The balls 62 are forcibly thrown outward from the bottom of the pockets 63 when they are caused to swing around the axis of the shaft 35. Since the balls 62 are received in contact between the conical clutch face 61 and the flywheel 40 and these are rotated at different speeds, the balls 62 roll therebetween and are simultaneously caused to move in an orbital path around the shaft 35. When the orbital velocity reaches a predetermined rate established by the bias force of the spring 49, the force tending to move the balls 62 radially outward becomes dominant and the component acting axially on the clutch member 53 exceeds the bias force and causes the clutch member 53 to shift axially forward and engage the teeth 31, 60. It can be seen that when the clutch member 53 is shifted forward, that the axial forces acting thereon are transmitted entirely by rolling contact. The balls 62 roll around on both the clutch face and the flywheel 40. Similarly the thrust bearing 52 provides rolling contact. Since the engaging and engaged condition of the clutch is the time of severest dynamic axial loading and since all contact is then rolling, sliding friction is virtually eliminated under dynamic load and lubrication of the system is much less critical than when areas of sliding contact are used to transmit thrust. This allows the use of greater axial forces in the system and greater forces provide more positive action in operation of the drawbolt 12.

The mechanism described also includes a limit switch actuator 66 that is axially slidable through the smaller shaft 46 which is also tubular. The forward end of the actuator 66 is adapted to engage the rear end drawbolt 12 and the rear end thereof is received against a roller 67 on the end of a switch actuating lever arm 68 extending from a limit switch unit 69. The arm 68 is biased to swing the roller 67 toward the actuator 66 and adjustment of the limit switch can be made to provide signals at desired times in the cycle of drawbolt operation as for example when the drawbolt 12 is pushed axially rearward by the insertion of a cutter into the spindle 10 prior to energization of the motor 33, 34 for engagement of the drawbolt 12. The operation of the limit switch 69 is not described in further detail herein since it forms no part of the present invention. The cited Patent 2,667,819 shows a similar switching device and describes its use in a control circuit.

While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:

1. In a machine tool, a mechanism for rotatably driving a power drawbolt through a spindle comprising in combination:
(a) a drive shaft in axial alignment with the drawbolt,
(b) a flywheel member fixed on said drive shaft for rotation therewith,
(c) a clutch member received around said drive shaft for rotation relative thereto and axial movement therealong to engage and drive the drawbolt, the clutch member including a conical cam portion adjacent to said flywheel member,
(d) bias means for urging said clutch member toward said flywheel member and away from the drawbolt,
(e) a plurality of balls received in contact between said flywheel member and conical cam portion for movement of said clutch member against said bias means to engage the drawbolt when moved radially outward from said drive shaft,
(f) a cage member received around said drive shaft and rotatable relative to said drive shaft and clutch member, said cage member having pockets extending radially outward to maintain said balls separated and spaced around the flywheel and clutch members,
(g) means for rotating said drive shaft, and
(h) means for rotating said clutch member at a rate reduced from the rate of said drive shaft, said balls thereby rolling between the flywheel and clutch member and simultaneously orbiting around said drive shaft with said cage member whereby said balls are thrown radially outward in said pockets and said clutch member is shifted against the bias means to engage the drawbolt.

2. The mechanism of claim 1 wherein:
(a) said means for rotating the clutch member is an orbital gear, speed reduction mechanism driven from said drive shaft and concentric therearound.

3. In a machine tool, a mechanism for rotatably driving a power drawbolt through a spindle comprising in combination:
(a) a motor having a drive shaft extending therefrom in axial alignment with the drawbolt,
(b) a flywheel member fixed on said drive shaft for rotation therewith,
(c) a clutch member concentric around said drive shaft and axially movable relative thereto to engage and drive the drawbolt, the clutch member including a conical cam portion adjacent to said flywheel member,
(d) bias means received between said drive shaft and clutch member for urging said clutch member toward said flywheel member and away from the drawbolt,
(e) a plurality of balls received in contact between said flywheel member and conical cam portion for movement of said clutch member against said bias means to engage the drawbolt when moved radially outward in said conical portion and away from said drive shaft,
(f) a cage member received around said drive shaft and rotatable relative to said drive shaft and clutch member, said cage member having pockets extending radially outward to maintain said balls separated and spaced around the flywheel and clutch members,
(g) a pinion gear fixed on said drive shaft inside said clutch member,
(h) a fixed internal gear concentric with and received around said clutch member, and
(i) a set of orbital gears, each orbital gear rotatably supported in the clutch member and engaged between said pinion and internal gear and operable to rotate said clutch member at a rate reduced from the rate of rotation of said drive shaft, said balls thereby rolling between the flywheel and clutch members and simultaneously orbiting around the drive shaft with said cage member whereby said balls are thrown radially outward in said pockets and said clutch member is shifted against the bias means to engage the drawbolt when said drive shaft is rotated at a predetermined rate.

4. In a machine tool spindle, a clutch mechanism for connecting a source of power to a drawbolt for rotation of the drawbolt in the spindle comprising in combination:
(a) a drive shaft connected to said source of power and rotatable thereby,
(b) a flywheel member fixed on said drive shaft,
(c) an actuating member concentric around said drive shaft and axially and rotatably movable relative thereto and having a conical cam surface facing inward toward said drive shaft and said flywheel member,
(d) bias means for urging said actuating member axially along said drive shaft toward said flywheel member,
(e) a cage member received around said drive shaft and rotatable relative to said drive shaft and actuating member, said cage member having radially oriented pockets spaced therearound,
(f) a plurality of balls, one of said balls received in each of said cage member pockets and in contact between said fllywheel member and conical cam surface, said balls pushed inward toward said drive shaft by said conical cam surface,
(g) means for rotating said drive shaft,
(h) means for rotating said actuating member at a rate reduced from the rate of rotation of said drive shaft, said balls thereby rolling between said flywheel and actuating members and simultaneously orbiting around said drive shaft with said cage member whereby said balls are thrown radially outward to shift said actuating member axially away from said flywheel member against said bias means, and
(i) means for connecting said actuating member to rotate said drawbolt when said actuating member is moved away from said flywheel member.

5. The clutch mechanism of claim 4 wherein:
(a) said means for rotating said actuating member is an orbital gear reduction mechanism concentric with said drive shaft and driven thereby, said orbital gear reduction mechanism including a set of orbiting gears rotatably received in said actuating member for transmission of a rotating force thereto.

6. A speed responsive clutch mechanism for connecting a machine tool drawbolt for rotation by a source of power comprising in combination:
(a) a rotatable drive shaft in axial alignment with the drawbolt,
(b) a flywheel fixed on the drive shaft,
(c) a clutch member concentric with said drive shaft and axially and rotatably movable relative thereto, said clutch member having a conical cam surface facing inward toward said drive shaft and flywheel member,
(d) bias means received between said drive shaft and clutch member for urging said clutch member axially toward said flywheel member,
(e) a cage member received around said drive shaft between said flywheel and clutch members and having a plurality of radially oriented pockets therein, said cage member freely rotatable relative to said drive shaft and flywheel and clutch members,
(f) a plurality of balls, one of said balls loosely received in each of said cage member pockets for rotation and movement therealong radially toward and away from said drive shaft, said balls in contact between said flywheel member and said clutch member and pushed inward toward said drive shaft by said clutch member,
(g) a motor connected to said drive shaft for rotation thereof, (h) means concentric with said drive shaft and connected thereto for transmitting rotational drive to said clutch member at a rate reduced from the rate of rotation of said drive shaft whereby said flywheel and clutch members rotate at different speeds, said balls rolling therebetween and orbiting around said drive shaft with said cage member for forceful movement radially outward therefrom to push said clutch member away from the flywheel member against said bias means when the orbital speed of said balls reaches a predetermined rate, and
(i) a clutch face integral with said clutch member and adapted for driving connection with the drawbolt when said clutch member is moved away from said flywheel member.

References Cited by the Examiner
UNITED STATES PATENTS

| | | |
|---|---|---|
| 2,667,819 | 2/1954 | De Vlieg _____ 90—11 |
| 2,667,820 | 2/1954 | De Vlieg. |
| 2,909,965 | 10/1959 | De Vlieg. |

WILLIAM W. DYER, JR., *Primary Examiner.*